(12) United States Patent
Harper et al.

(10) Patent No.: US 8,387,744 B2
(45) Date of Patent: Mar. 5, 2013

(54) MARINE SEISMIC SOURCE

(76) Inventors: Mark Harper, Cambridge (GB); Joseph A. Dellinger, Houston, TX (US); Martin Thompson, Cambridge (GB); Graham Openshaw, Portsmouth, NH (US)

( * ) Notice: Subject to any disclaimer, the term of this patent is extended or adjusted under 35 U.S.C. 154(b) by 40 days.

(21) Appl. No.: 12/980,527

(22) Filed: Dec. 29, 2010

(65) Prior Publication Data

US 2011/0162906 A1    Jul. 7, 2011

Related U.S. Application Data

(60) Provisional application No. 61/290,611, filed on Dec. 29, 2009.

(51) Int. Cl.
*G01V 1/04* (2006.01)
(52) U.S. Cl. .................. 181/120; 181/113
(58) Field of Classification Search ............. 181/113, 181/121, 120
See application file for complete search history.

(56) References Cited

U.S. PATENT DOCUMENTS

| | | | | |
|---|---|---|---|---|
| 3,392,369 A | * | 7/1968 | Dickie et al. | 367/143 |
| RE26,748 E | * | 12/1969 | Schempf | 181/120 |
| 3,658,118 A | * | 4/1972 | Abraham | 164/195 |
| 3,718,207 A | | 2/1973 | Babb | |
| 3,741,333 A | * | 6/1973 | Muniz et al. | 181/120 |
| 3,919,684 A | | 11/1975 | Reed | |
| 3,997,022 A | * | 12/1976 | Cholet | 181/120 |
| 4,016,952 A | * | 4/1977 | Reed et al. | 181/118 |
| 4,185,714 A | * | 1/1980 | Pascouet et al. | 181/120 |
| 4,483,411 A | | 11/1984 | Mifsud | |
| 4,991,685 A | * | 2/1991 | Airhart | 181/106 |
| 6,464,035 B1 | | 10/2002 | Chelminski | |
| 7,377,357 B2 | * | 5/2008 | Duren et al. | 181/121 |

FOREIGN PATENT DOCUMENTS

| | | |
|---|---|---|
| GB | 1556720 A | 11/1979 |
| GB | 2140560 A | 11/1984 |
| WO | 2009/153595 A2 | 12/2009 |

OTHER PUBLICATIONS

PCT Search Report and the Written Opinion of the International Searching Authority issued in related International application No. PCT/US2010/062329, mailed Sep. 21, 2011, 17 pages.

* cited by examiner

*Primary Examiner* — Forrest M Phillips
(74) *Attorney, Agent, or Firm* — Albert K. Shung

(57) ABSTRACT

A marine seismic source comprises a housing having a central axis, an open end, and a closed end opposite the open end. In addition, the seismic source includes a piston extending coaxially through the open end of the housing. The piston is adapted to axially reciprocate relative to the housing. Further, the piston has a first end distal the housing and a second end disposed within the housing.

25 Claims, 9 Drawing Sheets

MARINE SEISMIC SOURCE

CROSS-REFERENCE TO RELATED APPLICATIONS

This application claims benefit of U.S. provisional patent application Ser. No. 61/290,611 filed Dec. 29, 2009, and entitled "Marine Seismic Source," which is hereby incorporated herein by reference in its entirety for all purposes.

STATEMENT REGARDING FEDERALLY SPONSORED RESEARCH OR DEVELOPMENT

Not applicable.

BACKGROUND

1. Field of the Invention

The invention relates generally to seismic prospecting. More particularly, the invention relates to marine seismic sources for generating seismic waves.

2. Background of the Technology

Scientists and engineers employ seismic surveys for exploration, archeological studies, and engineering projects. In general, a seismic survey is an attempt to map the subsurface of the earth to identify formation boundaries, rock types, and the presence or absence of fluid reservoirs. Such information greatly aids searches for water, geothermal reservoirs, and mineral deposits such as hydrocarbons (e.g., oil, natural gas, etc.). Petroleum companies frequently use seismic surveys to prospect for subsea petroleum reserves.

During a subsea or marine seismic survey, an acoustic energy source, also referred to as a seismic energy source or simply a seismic source, is introduced into the water above the geologic formations of interest. Each time the source is triggered, it generates a seismic energy signal that propagates downward through the water and the water-sea floor boundary, and into the subsea geological formations. Faults and boundaries between different formations and rock types create differences in acoustic impedance that cause partial reflections of the seismic waves. These reflections cause acoustic energy waves to move upward and out of the formation, where they may be detected at the seafloor by an array of seismic energy receivers (e.g., ocean-bottom geophones), or where they may be detected within the seawater by an array of seismic energy receivers (e.g., spaced hydrophones).

The receivers generate electrical signals representative of the acoustic or elastic energy arriving at their locations. The signals are usually amplified and then recorded or stored in either analog or digital form. The recording is made as a function of time after the triggering of the seismic energy source. The recorded data may be transported to a computer and displayed in the form of traces, i.e., plots of the amplitude of the reflected seismic energy as a function of time for each of the seismic energy receivers. Such displays or data subsequently undergo additional processing to simplify the interpretation of the arriving seismic energy at each receiver in terms of the subsurface layering of the earth's structure. Sophisticated processing techniques are typically applied to the recorded signals to extract an image of the subsurface structure.

There are many different methods for producing acoustic energy waves or pulses for seismic surveys. Conventional seismic surveys typically employ artificial seismic energy sources such as explosives (e.g., solid explosives or explosive gas mixtures), shot charges, air guns, or vibratory sources to generate acoustic waves. Some of these approaches provide for strong acoustic waves, but may be harmful to marine life and/or be incapable of generating energy only within a specified frequency range of interest. A more controllable approach is the use of a subsea or marine reciprocating piston seismic source. Traditionally, such devices utilize a piston that reciprocates against the water to generate extended-time, acoustic-energy frequency sweeps. The piston is driven by a source of mechanical force, which may be a linear actuator, a voice coil, or a piezoelectric crystal transducer. The piston may be directly driven, with the motion of the piston almost entirely constrained, or may resonate by balancing water forces against a tunable spring, with the driving force only "topping up" the energy lost to the water. Further, the piston may be partially constrained and partially allowed to undergo a controlled resonance. The tunable spring may be, for example, a mechanical spring, a regenerative electromagnetic inductive device, an air spring, or a combination of these.

FIG. 1 shows a simplified example of a conventional reciprocating piston marine seismic source 10 disposed beneath the sea surface 11 in water 12. Source 10 includes a cylinder 15 having a central axis 19 and a piston 20 coaxially disposed in the cylinder 15. Cylinder 15 has a lower end 15a open to the water 12 and an upper end 15b closed off with a cap 16. Piston 20 sealingly engages the inner surface of cylinder 15, thereby defining a chamber or volume 17 within cylinder 15 that is filled with a compressible gas such as air or nitrogen. Piston 20 has a flat or planar end 20a that faces and operates against the water 12 in lower end 15a of cylinder 15 and a flat or planar end 20b opposite end 20a that faces chamber 17. Piston 20 is coupled to an actuator 25 disposed in chamber 17 with a shaft 21. Actuator 25 is fixed relative to cylinder 15 with supports 26, and axially reciprocates piston 20 within cylinder 15. As piston 20 reciprocates, planar face 20a acts against water 12 in lower end 15a to generate acoustic energy waves that propagate through the water 12.

As shown in FIG. 1, in many conventional oscillating piston marine-seismic sources, the piston 20 has a planar surface 20a that faces and operates against the water 12. In addition, the piston 20 is completely disposed within cylinder 15. In particular, cylinder open end 15a extends axially beyond planar face 20a of piston 20, thereby defining a water-filled recess or cavity 21 at open end 15a of the cylinder 15. Computational-fluid-dynamics (CFD) modeling has indicated that for relatively low frequencies (e.g., less than 5 Hz) and large amplitudes (e.g., greater than 200 mm of peak-to-peak amplitude) of piston movement, planar surface 20a and water-filled recess 21 at the open end 15a of most conventional piston-driven seismic sources combine to produce undesirable turbulence in the water 12 proximal open end 15a. For example, in FIG. 2, CFD modeling illustrates velocity vectors in the water 12 around the open end 15a of the cylinder 15. In particular, turbulent vortices 13, 14 are generated in the water 12 within and outside, respectively, the open end 15a of the cylinder 15. Such turbulence and associated vortices undesirably cause a portion of the energy generated by the piston 20 and transferred into the water 12 to be dissipated uselessly into heat, thereby reducing the potential acoustic energy and the overall acoustic efficiency of the device 10.

At higher frequencies and shallow water depths, another serious problem can happen with an oscillating-piston seismic source—cavitation. In general, cavitation occurs when the local static pressure head minus the local vapor pressure head becomes less than the local piston-velocity head for some point on the piston face. When cavitation occurs, the seawater temporarily decouples from the moving piston face, leaving a vacuum or vapor bubble adjacent to that part of the piston face. The vacuum then collapses violently, possibly damaging the piston face in the process. The collapse also produces a violent impulsive sound, the avoidance of which is at least one reason to use an oscillatory piston source. Still further, the abrupt collapse produces turbulence, which dissipates energy uselessly as heat instead of as acoustic radiation.

Accordingly, there remains a need in the art for marine seismic sources that produce energy in a controlled frequency sweep that is extended in time, without any impulsive shocks, and that produce energy only in the frequency bands of interest, and not outside it, so that only the minimum necessary peak power is emitted at each frequency and all the energy emitted is useful. Such sources would be particularly well received if they can produce energy at frequencies lower than about 8 Hz, which has proven to be difficult to achieve to date using conventional air guns.

BRIEF SUMMARY OF THE DISCLOSURE

These and other needs in the art are addressed in one embodiment by a marine seismic source. In an embodiment, the marine seismic source comprises a housing having a central axis, an open end, and a closed end opposite the open end. In addition, the marine seismic source comprises a piston extending coaxially through the open end of the housing. The piston is adapted to axially reciprocate relative to the housing. Further, the piston has a first end distal the housing and a second end disposed within the housing.

These and other needs in the art are addressed in another embodiment by a marine seismic source. In an embodiment, the marine seismic source comprises a cylindrical housing having a central axis, a first end, and a second end opposite the first end. In addition, the marine seismic source comprises a piston at least partially disposed within the housing, wherein the piston is adapted to axially reciprocate relative to the housing. The piston has a first end, a second end opposite the first end, and a radially outer surface extending between the first end and the second end. The outer surface of the piston is disposed at an outer radius R that increases moving axially from the first end.

These and other needs in the art are addressed in another embodiment by a system for performing offshore seismic exploration operations. In an embodiment, the system comprises a seismic vessel disposed at the sea surface. In addition, the system comprises an oscillating piston seismic source coupled to the seismic vessel and disposed below the sea surface. The seismic source includes a cylindrical housing having a central axis and an open end. Further, the seismic source includes a piston coaxially disposed in the housing and extending axially through the open end of the housing. The piston has a first end outside the housing and a second end disposed within the housing. The piston also has an outer surface disposed at a radius R that increases moving axially from the first end.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
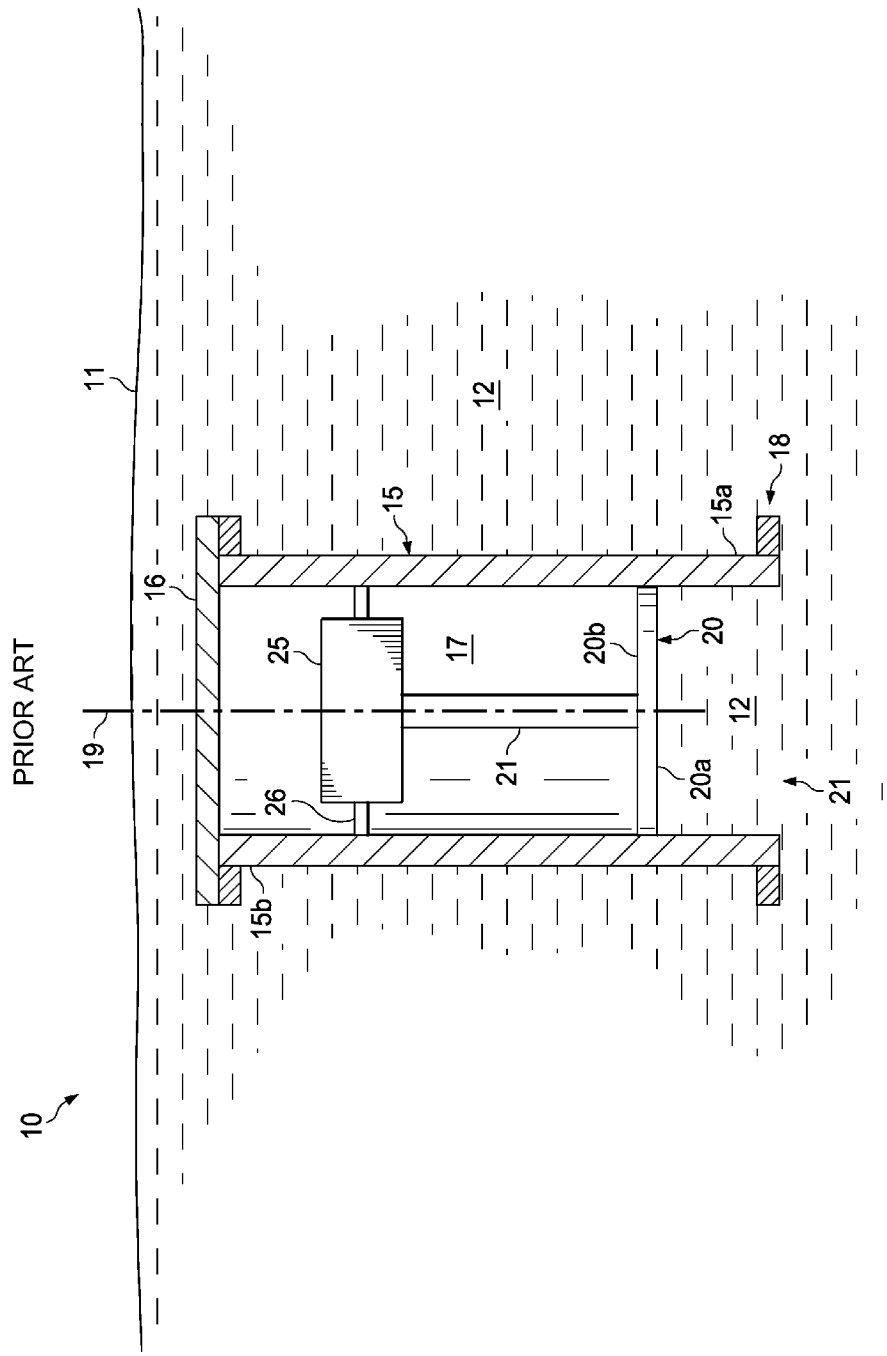
FIG. 1 is a schematic cross-sectional view of a conventional reciprocating piston marine seismic source.
Figure 2:
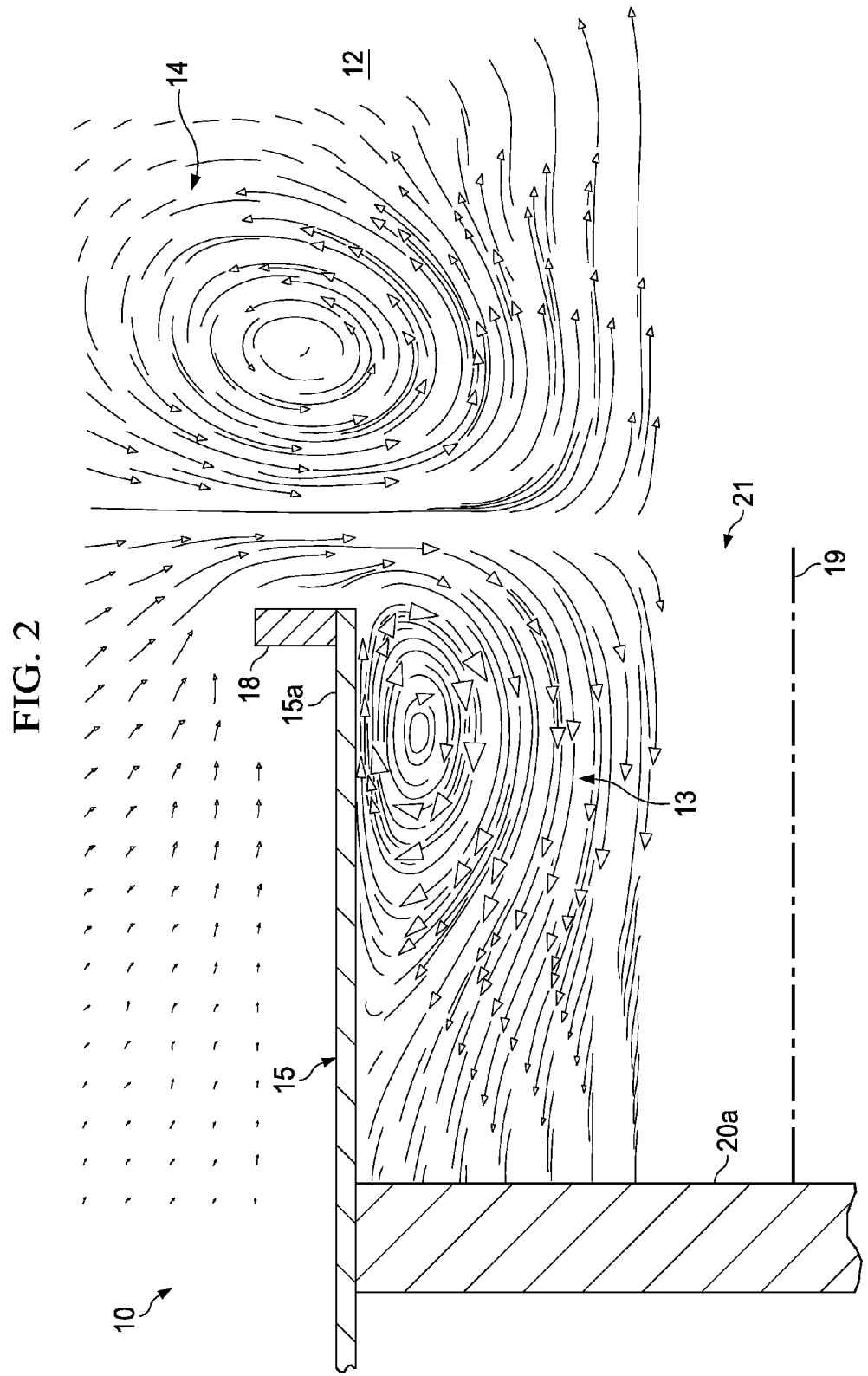
FIG. 2 is a computational-fluid-dynamics (CFD) model of the conventional marine seismic source of FIG. 1.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. In addition, as used herein, the terms "axial" and "axially" generally mean along or parallel to a central axis (e.g., central axis of a structure), while the terms "radial" and "radially" generally mean perpendicular to the central axis. For instance, an axial distance refers to a distance measured along or parallel to the central axis, and a radial distance means a distance measured perpendicular to the central axis.

Figure 3:
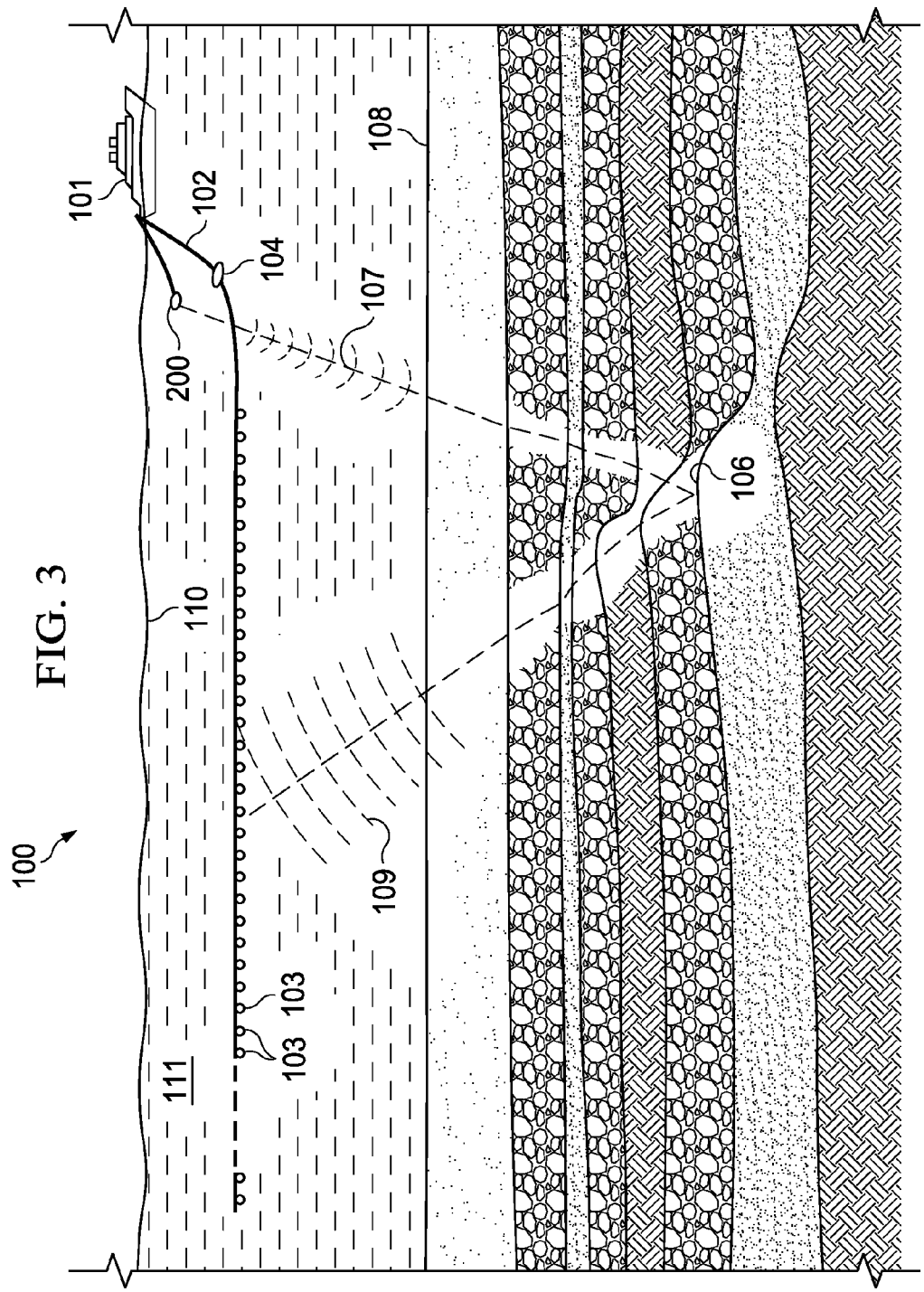
FIG. 3 is a schematic illustration of an embodiment of a marine seismic survey environment.

Referring now to FIG. 3, an embodiment of a marine seismic acquisition system 100 is schematically shown. System 100 is employed to perform marine seismic-exploration operations to survey geological formations below the surface 110 of water 111. In this embodiment, system 100 includes at least one seismic survey ship 101 that tows at least one streamer 102 including multiple evenly-spaced seismic sensors or receivers 103. Each streamer 102 may also include a diverter 104 and depth controller that operate to position streamer 102 at a desired offset distance from ship 101 and down to a desired operating depth below the water surface 110, respectively.

Streamers 102 may be up to several kilometers long, and are usually constructed in 100-150 meter sections, each section including a group of up to 35 or more uniformly spaced receivers 103. In general, receivers 103 may comprise any suitable type of seismic receiver including, without limitation, hydrophones, geophones, or combinations thereof. Typically, an electrical or fiber-optic cabling is used to interconnect receivers 103 on each streamer 102 and to connect each streamer 102 to ship 101. Data may be digitized proximal receivers 103 and transmitted to ship 101 through the cabling at relatively high data transmission rates (e.g., rates in excess of 5 million bits of data per second). As shown in FIG. 3, receivers 103 are towed behind survey ship 101. However, in other embodiments, the streamers (e.g., streamers 102) and the receivers (e.g., receivers 103) may be positioned along the sea floor as ocean-bottom cables. The receivers disposed on the sea floor may be autonomous ocean-bottom nodes. Alternatively, ship-towed streamers and ocean-bottom nodes may also be used simultaneously.

Referring still to FIG. 3, system 100 also includes a marine seismic source 200. As shown in FIG. 3, source 200 is towed behind seismic survey ship 101. However, in other embodiments, particularly those employing a low-frequency source (e.g., low-frequency source 200), the source is preferably towed behind a different ship than the receivers (e.g. receivers 103). Although there are many different types of marine seismic sources, in this embodiment, seismic source 200 is an oscillating piston seismic source. Source 200 and receivers 103 are deployed below the ocean's surface 110, the optimal depth depending on a variety of factors including, without limitation, the sea conditions, the towing strength of the equipment, and the desired frequency range to be produced and recorded. For a low-frequency marine seismic source producing acoustic energy in the range 2-8 Hz, for example, an optimal tow depth of the source is about 60 to 76 m.

Equipment aboard ship 101 controls the operation of source 200 and receivers 103, and records the acquired data. Seismic surveys provide data for estimating the distance between the ocean surface 110 and subsurface structures such as structure 106, which lies below the ocean floor 108. By estimating various distances to a subsurface structure, the geometry or topography of the structure can be determined. Certain topographical features and amplitudes of recorded seismic data are indicative of oil and/or gas reservoirs.

To determine a distance to subsurface structure 106, source 200 emits seismic waves 107, some of which reflect off subsurface structure 106 (as well as other subsurface structures) as "echoes" or reflected seismic waves 109, which are detected by receivers 103. By determining the time for the seismic waves 107 to travel from source 200 to subsurface structure 106, and reflect off structure 106 as echoes 109 to receivers 103, an estimate of the distance (both horizontally and vertically) and geometry of subsurface structure 106 can be determined.

Figure 4:
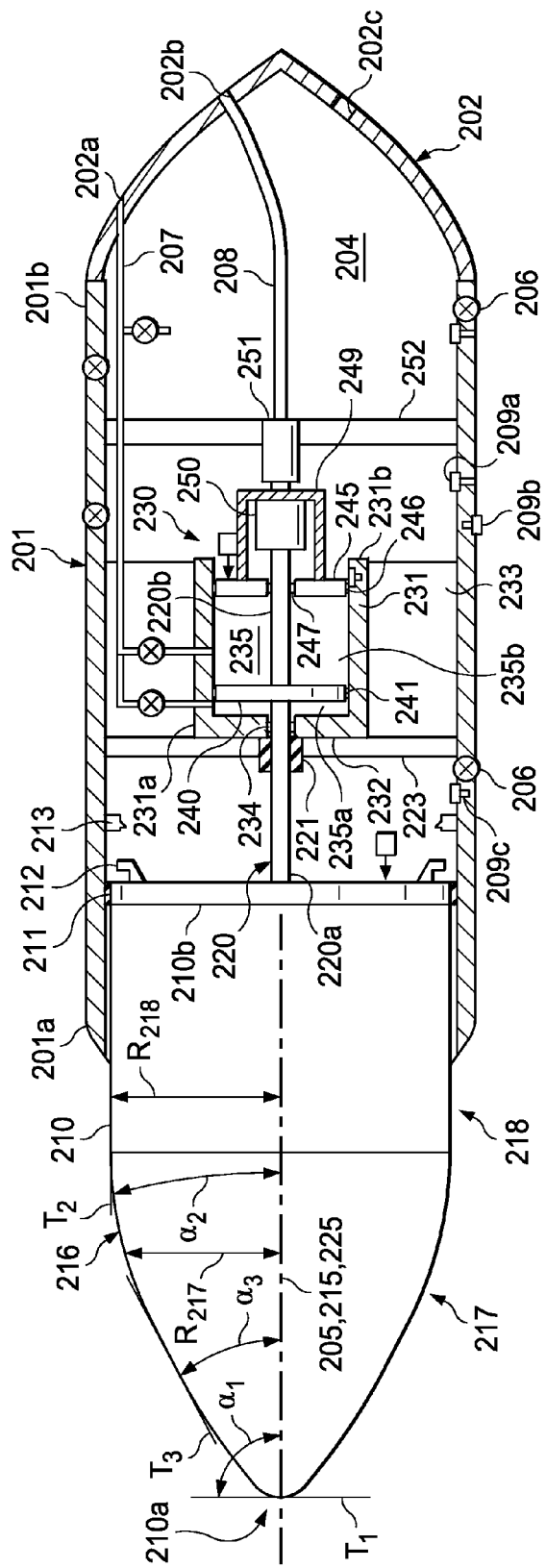
FIG. 4 is a cross-sectional view of an embodiment of a reciprocating piston marine seismic source in accordance with the principles described herein.
Figure 5:
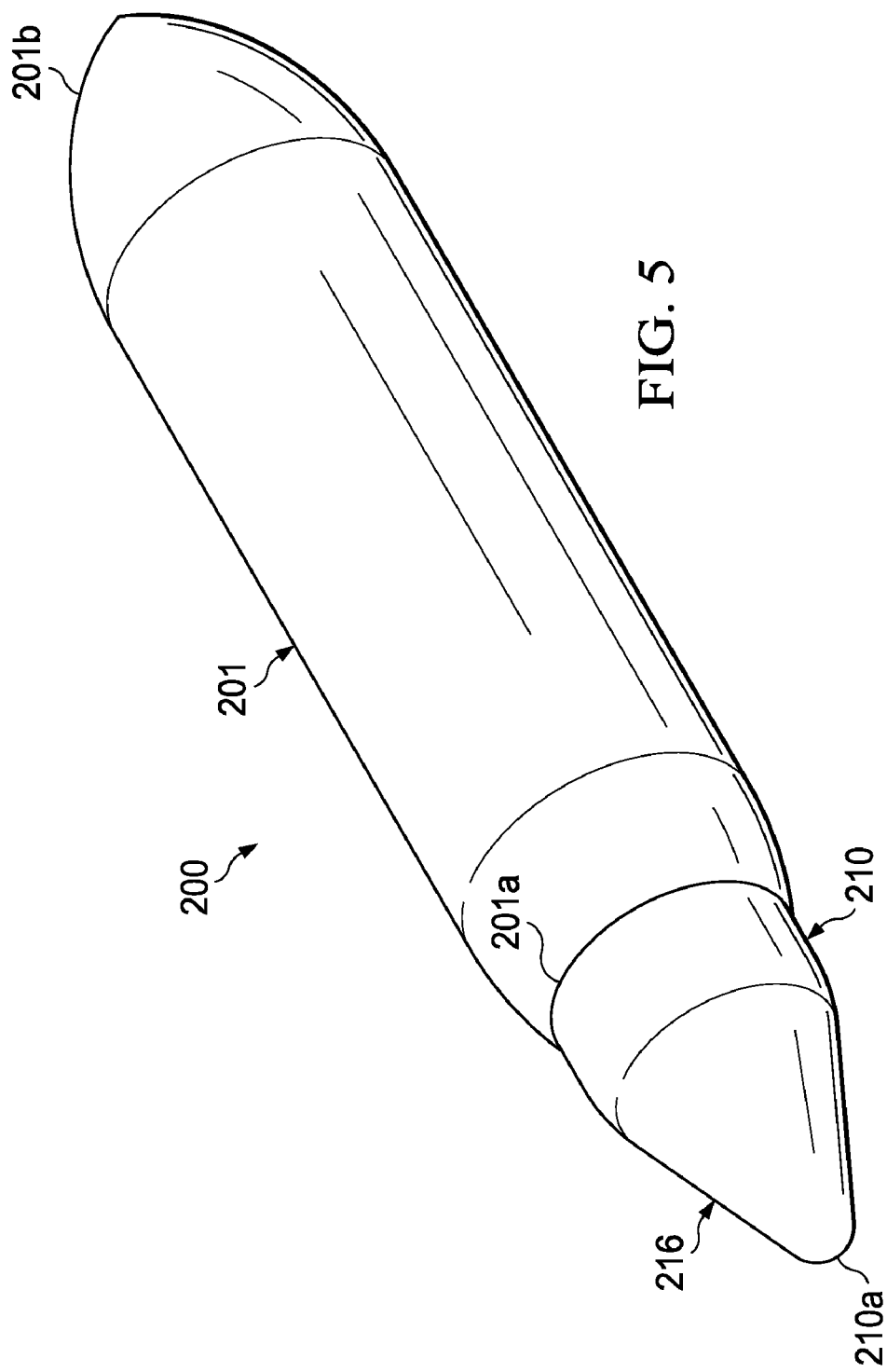
FIG. 5 is a perspective view of the reciprocating piston marine seismic source of FIG. 4.
Figure 6:
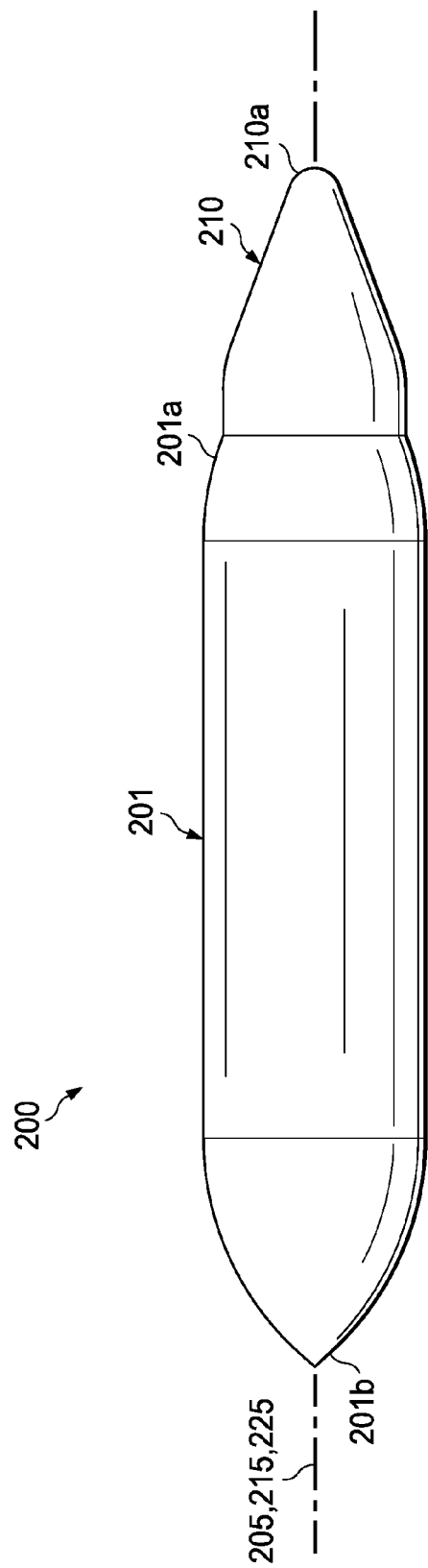
FIG. 6 is s side view of the reciprocating piston marine seismic source of FIG. 4.

Referring now to FIGS. 4-6, an embodiment of marine seismic source 200 is shown. Source 200 includes a radially outer housing 201 having a central axis 205 and a reciprocating piston 210 coaxially received by housing 201. Housing 201 has a first or open end 201a and a second or closed end 201b. An end cap 202 sealingly engages cylinder 210 and closes cylinder 210 at end 201b. In this embodiment, end cap 202 includes a plurality of through ports 202a, b, c. Ports 202a allow compressed air supply line(s) 207 to pass through end cap 202 into housing 201, ports 202b allow hydraulic fluid supply line(s) 208 to pass through end cap 202 into housing 201, and electrical connections (e.g., sensor cables, electronic control wiring, etc.) allow wiring and cables to pass through end cap 202 into housing 201. For purposes of clarity, electrical connections and wiring are not shown in FIG. 4. Ports 202a, b, c include fluid-tight seals that allow the passage of lines 207, 208 and electrical connections through end cap 202, while restricting and/or preventing the (a) ingress water into housing 201 at end 201b, and (b) egress of fluid from housing 201 at end 201b.

As best shown in FIGS. 5 and 6, in this embodiment, the radially outer surface of housing 201 does not include any flanges, structures, or appendages extending radially outward. In other words, the radially outer surface of housing 201 is "continuously contoured." As used herein, the term "continuously contoured" may be used to describe surfaces and profiles that are smooth and/or continuously curved so as to be free of extensions, sharp edges, and abrupt transitions. Further, the outer surface of housing 201 tapers or converges radially inward to the outer surface of piston 210 at end 201a to provide a continuously contoured, smooth transition from housing 201 to piston 210 at end 201a.

Referring to FIG. 4, in this embodiment, housing 201 includes a plurality of drain valves 206 and a plurality of sensors 209a, b, c. Sensor 209a is an internal pressure sensor that detects and measures the pressure within housing 201, sensor 209b is an external pressure sensor that detects and measures the pressure outside of housing 201 (i.e., the pressure of water 111), and sensor 209c is a fluid level sensor that detects and measures the level of any liquid that may have made its way into housing 201.

Piston 210 slidingly engages the cylindrical inner surface of housing 201 and extends axially from open end 201a of housing 201. Piston 210 axially reciprocates relative to housing 201 to generate acoustic energy waves in water 111. Together, piston 210, end cap 202, and housing 201 define an interior chamber 204 within housing 201 that extends axially between piston 210 and end cap 202. Interior chamber 204 is filled with a gas such as air or nitrogen.

Piston 210 has a central axis 215 coincident with cylinder axis 205, and extends axially between a first end 210a and a second end 210b. As previously described, piston 210 extends through open end 201a of housing 201. In particular, first end 210a is positioned outside housing 201 and engages water 111, and second end 210b is disposed within housing 201 and faces interior chamber 204. An annular seal 211 is mounted to the inner surface of housing 201 and is radially positioned between piston 210 and housing 201. Seal 211 forms an annular dynamic seal with piston 210 and an annular static seal with housing 201. In other words, seal 211 is stationary relative to housing 201. Annular seal 211 restricts and/or prevents fluid communication between chamber 204 within housing 201 and water 111 outside housing 201. Thus, seal 211 restricts and/or prevents water 111 surrounding seismic source 200 from moving axially between piston 210 and housing 201 to interior chamber 204, and restricts and/or prevents gas in interior chamber 204 from moving axially between piston 210 and housing 201 into water 111 surrounding seismic source 200.

Referring still to FIG. 4, unlike most conventional reciprocating piston seismic sources (e.g., source 10 previously described), piston 210 does not include a flat or planar face that engages the water 111 to generate acoustic waves, and further, source 200 does not include an open cavity or recess at either cylinder end 201a, b. Rather, in this embodiment, piston 210 presents a continuously contoured bullet-shaped surface to the water 111. In addition, piston 210 extends axially through open end 201a and is sized to eliminate any open recesses or cavities at open end 201a. In particular, piston 210 includes a first section or segment 217 extending axially from end 210a, and a second section or segment 218 extending from end 210b to first section 217. In addition, piston 210 has a radially outer surface 216 extending between ends 210a, b.

Figure 9:
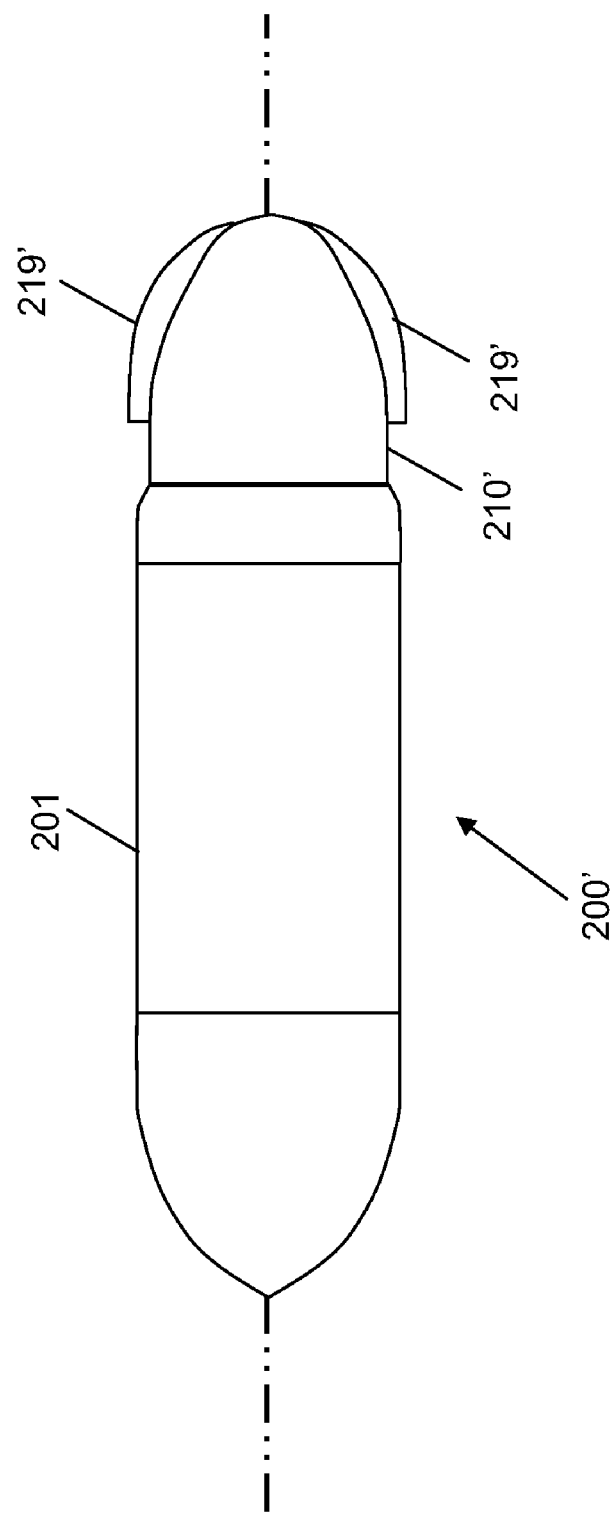
FIG. 9 is a side view of an embodiment of a reciprocating piston marine seismic source in accordance with the principles described herein.

Referring again to FIGS. 4-6, outer surface 216 is continuously contoured and generally bullet-shaped along section 217 and is cylindrical along section 218. Specifically, first section 217 has an outer radius R.sub.217 measured perpendicularly from axis 215 to radially outermost surface 216, and second section 218 has an outer radius R.sub.218 measured perpendicularly from axis 215 to radially outermost surface 216. Moving axially along first section 217 from first end 210a to second section 218, outer radius R.sub.217 continuously increases. At first end 210a, outer radius R.sub.217 is zero, and at the intersection of sections 217, 218, outer radius R.sub.217 is the same as outer radius R.sub.218, thereby forming a smooth transition along outer surface 216 at the intersection of sections 217, 218. Thus, outer surface 216 of piston 210 may be described as converging or tapering radially inward moving axially from second section 218 to first end 210a. In this embodiment, outer surface 216 has a generally parabolic profile along first section 217, and thus, is slightly convex between end 210a and second section 218. However, in general, the outer surface of the piston facing the water (e.g., surface 216) may have any smooth, continuously contoured geometry that tapers or converges radially inward as it extends from the cylinder (e.g., housing 201) including, without limitation, conical or hemispherical. In some embodiments, a plurality of circumferentially spaced, axially extending raised ribs or fins may be provided along the outer surface of the piston. Such fins are preferably uniformly circumferentially spaced (e.g., two fins spaced 180.degree. apart about the source central axis) and extend axially from the distal or end of the piston (e.g., extend axially from end 210a). For example, FIG. 9 illustrates an embodiment of a marine seismic source 100' including a reciprocating piston 210' that includes a pair of uniformly circumferentially spaced fins 219', each fin 219' extending axially from the distal end of piston 210'.

Referring again to FIGS. 4-6, the geometry of section 217 may also be described in terms of the angular orientation of tangents to the outer profile of section 217 at various points along surface 216 in profile view. As used herein, a "profile view" refers to a view of a structure or component in a plane containing the central axis of the structure or component. Thus, a profile view of section 217 is a view of section 217 in a plane containing central axis 215 (e.g., FIG. 4). As shown in FIG. 4, a tangent T.sub.1 to surface 216 and the outer profile of section 217 at end 210a (i.e., at the intersection of axis 215 and surface 216) is orientated at an angle .alpha..sub.1 relative to axes 205, 215 in profile view, a tangent T.sub.2 to surface 216 and the outer profile of section 217 at the intersection with section 218 is orientated at an angle .alpha..sub.2 relative to axes 205, 215 in profile view, and a tangents T.sub.3 to surface 216 and the outer profile of section 217 at a point between end 210a and section 218 is orientated at an angle .alpha..sub.3 relative to axes 205, 215 in profile view. In this embodiment, tangent T.sub.1 is perpendicular to axes 205, 215 in profile view, and thus, angle .alpha..sub.1 is 90.degree., tangent T.sub.2 is parallel to axes 205, 215 in profile view, and thus, angle .alpha..sub.2 is 0.degree., and tangent T.sub.3 is oriented at an acute angle (i.e., between 0.degree. and 90.degree.) relative to axes 205, 215 in profile view. Indeed, at every point along the outer profile of section 217 between end 210a and section 218, the tangent to surface 216 in profile view is an acute angle relative to axes 205, 215. More specifically, moving from end 210a to section 218 along surface 216 and the outer profile of section 217 in profile view, the angular orientation of each tangent to surface 216 decreases from 90.degree. at end 210a (i.e., .alpha..sub.1) to 0.degree. at the intersection of sections 217, 218 (i.e., .alpha..sub.2).

Outer radius $R_{218}$ of second section 218 is constant and uniform between section 217 and second end 210b, and thus, outer surface 216 is cylindrical along section 218. Outer radius $R_{218}$ is substantially the same or slightly less than the inner radius of housing 201, and thus, along second section 218, outer surface 216 slidingly engages the radially inner surface of housing 201.

As previously described, piston 210 extends axially through open end 201a of housing 201. In particular, piston 210 and housing 201 are sized and configured to prevent and eliminate the formation of a water filled cavity or recess at open end 201a. In this embodiment, during operation of source 200 and reciprocation of piston 210 relative to housing 201, first section 217 is positioned external housing 201. In other words, during reciprocation of piston 210, at least a portion of second section 218 extends axially from or is axially aligned with end 201a. Thus, first section 217 does not axially pass through open end 201a during operation of source 200. Further, as previously described, section 218 slidingly engages housing 201. Thus, no water-filled cavities or recesses are formed at open end 201a during operation of source 200.

Depending on the application and desired acoustic waves, the maximum outer radius of the piston (e.g., outer radius $R_{218}$ of second section 218 of piston 210) and the cylinder (e.g., radius of housing 201) may be varied. Typically, the piston will have a maximum outer radius on the order of approximately one-half a meter to a few meters, depending on the desired frequency range and amplitude of acoustic radiation to be produced.

Referring again to FIG. 4, an elongate shaft 220 having a central axis 225 coincident with axis 205 of housing 201 extends axially between a first end 220a coupled to piston 210 and a second end 220b distal piston 210. Shaft 220 is slidingly supported by a linear bearing 221 that allows shaft 220 to move axially relative to housing 201 and bearing 221. A plurality of circumferentially spaced support members 223 extend radially through chamber 204 from housing 201 to bearing 221, and function to support and maintain the position of bearing 221 within housing 201.

In this embodiment, seismic source 200 also includes a tunable gas-spring assembly 230 disposed within source chamber 204. Gas-spring assembly 230 comprises a gas-spring cylinder 231 coaxially disposed within housing 201, a gas-spring piston 240 coaxially disposed within cylinder 231, a squeeze piston 245 coaxially disposed within cylinder 231 and axially spaced apart from gas-spring piston 240, and a linear actuator 250. Gas-spring cylinder 231 extends axially between a first end 231a axially abutting bearing 221 and a second end 231b opposite first end 230a, and includes a cylindrical internal chamber 235. Gas-spring cylinder 231 is supported by a plurality of circumferentially spaced support members 233 that extend radially through chamber 204 from housing 201 to gas-spring cylinder 231. As will be described in more detail below, shaft 220 extends coaxially through gas-spring cylinder 231.

An end cap 232 extends radially between shaft 220 and gas-spring cylinder 231 at end 231a. End cap 232 sealingly engages end 231a of cylinder 231 and sealingly engages shaft 220 extending therethrough—a radially outer annular static seal is formed between end cap 232 and cylinder 231, and a radially inner dynamic seal is formed between end cap 232 and shaft 220. The radially outer static seal between end cap 232 and cylinder 231, and the radially inner seal between end cap 232 and shaft 220 restrict and/or prevent fluid communication between gas-spring chamber 235 and source chamber 204 disposed about chamber 235 at end 231a. In this embodiment, the radially inner seal between end cap 232 and shaft 220 is formed by an annular seal 234 that statically engages end cap 232 and dynamically engages shaft 220.

Referring still to FIG. 4, gas-spring piston 240 is disposed within gas-spring cylinder 231 and is axially positioned between end cap 232 and squeeze piston 245. Piston 240 is fixed to shaft 220 such that piston 240 does not move rotationally or translationally relative to shaft 220. In other words, piston 240 moves along with shaft 220. An annular seal 241 is disposed about piston 240 and sealingly engages gas-spring cylinder 231. Seal 241 forms an annular static seal with piston 240 and an annular dynamic seal with gas-spring cylinder 231.

Annular squeeze piston 245 is coaxially disposed within chamber 235 and is axially spaced apart from piston 240. Piston 245 is disposed about and slidingly engages shaft 220. Thus, unlike piston 240 previously described, squeeze piston 245 is free to move axially relative to shaft 220. An annular seal 246 is radially disposed between piston 245 and gas-spring cylinder 231, and an annular seal 247 is radially disposed between piston 245 and shaft 220. Seals 246, 247 form annular static seals with piston 245 and annular dynamic seals with gas-spring cylinder 231 and shaft 220, respectively.

Pistons 240, 245 divide internal chamber 235 of gas-spring cylinder 231 into a first chamber 235a extending axially between end cap 232 and piston 240, and second chamber 235b extending axially between pistons 240, 245. First chamber 235a may be described as being defined by gas-spring cylinder 231, piston 240, and end cap 232, and second chamber 235b may be described as being defined by gas-spring cylinder 231, piston 240, and squeeze piston 245. The total mass of gas in chambers 235a, b is fixed during operation of source 200, however, the total volume within chambers 235a, 235b is controllably varied during the operation of source 200. In particular, the axial distance between pistons 210, 240 is fixed since both pistons 210, 240 are fixed to shaft 220. Thus, as piston 210 oscillates within housing 201, piston 240 also oscillates—the axial movements of piston 210 are transferred to piston 240 by shaft 220. As a result, the volume and hence pressure within chambers 235a, b varies with time due to the oscillations of pistons 210, 240.

Referring still to FIG. 4, squeeze piston 245 is coupled to a thrust yoke 249, and thrust yoke 249 is coupled to linear actuator 250, which presents a relatively large mechanical impedance to the movement of piston 245 as compared to the mechanical impedance presented by the fluid pressure within chambers 235a, b. A hydraulic ram 251 including a load cell is axially coupled to yoke 249 and actuator 250. A plurality of circumferentially spaced support members 252 extend radially from ram 251 to housing 201, and function to support and maintain the position of ram 251, actuator 250, and yoke 249 within housing 201. In this embodiment, ram 251 is a hydraulic ram powered by hydraulic fluid provided through hydraulic fluid supply line 208. However, in other embodiments, the ram (e.g., ram 251) may be a different type of ram such as an electric ram.

The axial position of squeeze piston 245 within gas-spring cylinder 231 is controlled by actuator 250 and is not affected by changes in the volume and pressure of the gas in chamber 235b, which result from oscillations of piston 210, 240 previously described. In particular, shaft 220 extends axially through actuator 250 to ram 251. Actuator 250 moves axially along shaft 220 to adjust the axial position of squeeze piston 245 within cylinder 231 via yoke 249. In this embodiment, actuator 250 includes a position sensor (not shown) which allows a control system to measure and detect the axial position of squeeze piston 245 relative to cylinder 231 at any time. In general, the control system may measure and detect the axial position of squeeze piston 245 by any suitable manner known by those skilled in the art. In this embodiment, actuator 250 is driven by an electric motor.

Prior to operating source 200, the mass of gas in interior chamber 204 enclosed by housing 201 should be such that piston 210, at rest, is axially positioned near the midpoint of its potential range of motion and is not close to bearing 221. This can be accomplished by pumping a gas such as compressed air into or out of interior chamber 204 via supply line(s) 207.

To initiate operation of marine seismic source 200, actuator 250 axially retracts squeeze piston 245 within cylinder 231 toward end 201b relative to piston 240. As a result, squeeze piston 245 moves axially towards end 201b, the volume in chamber 235b increases and the pressure in chamber 235b decreases. Hydraulic ram 251 is then used to excite shaft 220 and pistons 210, 240 into oscillating axial motion so that acoustic energy is radiated from piston 210 into surrounding water 111 at end 201a. This may be accomplished by producing a large initial axial displacement with hydraulic ram 251 and then allowing pistons 210, 240 to oscillate freely, by applying an axial force proportional to the velocity of piston 210 so that it becomes negatively damped and oscillates with increasing amplitude until the radiated acoustic energy and losses due to friction cause sufficient loss of energy to limit the oscillations, by applying an axial force proportional to the sign of the velocity of the piston 210 so that it becomes similarly negatively damped, or by a combination of these methods. Applying a velocity-dependent force may be accomplished using a simple feedback system from a velocity or position sensor attached to any part of piston 210 or shaft 220 in any suitable manner.

The initial displacement of piston 210 may be achieved by applying an axial force with hydraulic ram 251 as previously described, or by temporarily withdrawing gas from interior chamber 204, latching piston 210 in its axially displaced position with mating latch members 212, 213 extending from piston 210 and housing 201, respectively, returning the gas to interior chamber 204 and then releasing latches 212, 213. Alternatively it may be produced by axially retracting piston 245 toward end 201b such that piston 240, and hence piston 210, are axially displaced, latching piston 210 as previously described, returning the piston 245 to its former position and then releasing latches 212, 213.

Once the initial oscillation of piston 210 is triggered, tunable air-spring assembly 230 is continuously adjusted via a control feedback loop to maintain resonance at the desired frequency. The device balances the axial forces applied to piston 210 by the air-spring assembly 230 with the axial forces applied to piston 210 by water 111 (i.e., water pressure and the inertia of the water mass moving with piston 210). Exemplary methods for initiating and maintaining such resonant oscillations of a piston in a marine seismic source (e.g., source 200) are disclosed in PCT Patent Application Serial No. PCT/GB2009/050690, which is hereby incorporated herein by reference in its entirety for all purposes.

As previously described, many conventional reciprocating piston marine seismic sources, such as that shown in FIG. 1, include a reciprocating piston with a flat or planar surface facing the water (e.g., planar surface 20a of piston 20). Further, the piston is typically positioned within the cylinder, resulting in a water filled recess or cavity at the open end of the cylinder (e.g., water-filled cavity 21 at open end 15a of the cylinder 15). However, computational-fluid-dynamics (CFD) modeling has indicated that for relatively low frequencies and large amplitudes of piston movement, the planar surface and annular lip combine to produce undesirable turbulence in the water proximal the open end of the cylinder. Such turbulence and associated vortices undesirably cause a portion of the energy generated by the piston to be dissipated uselessly into heat, thereby reducing the potential acoustic energy and the overall acoustic efficiency of the device. Similarly, at higher frequencies and shallow water depth, movement of the piston can induce cavitation, producing an unwanted impulsive sound, possibly damaging the device, and reducing the acoustic efficiency of the device. However, as is described below, embodiments of marine seismic source 200 described herein offer the potential to reduce such undesirable turbulence and/or cavitation.

Referring again to FIGS. 4-6, as previously described, in this embodiment, piston 210 does not include a planar or flat face that engages the water; rather, piston 210 includes a continuously contoured bullet-shaped section 217 that engages the water to generate acoustic energy pulses. Moreover, in this embodiment, piston 210 extends axially through open end 201a of housing 201, and piston 210 and housing 201 are sized and configured such that source 200 does not include a water-filled cavity or recess at open end 201a.

Figure 7:
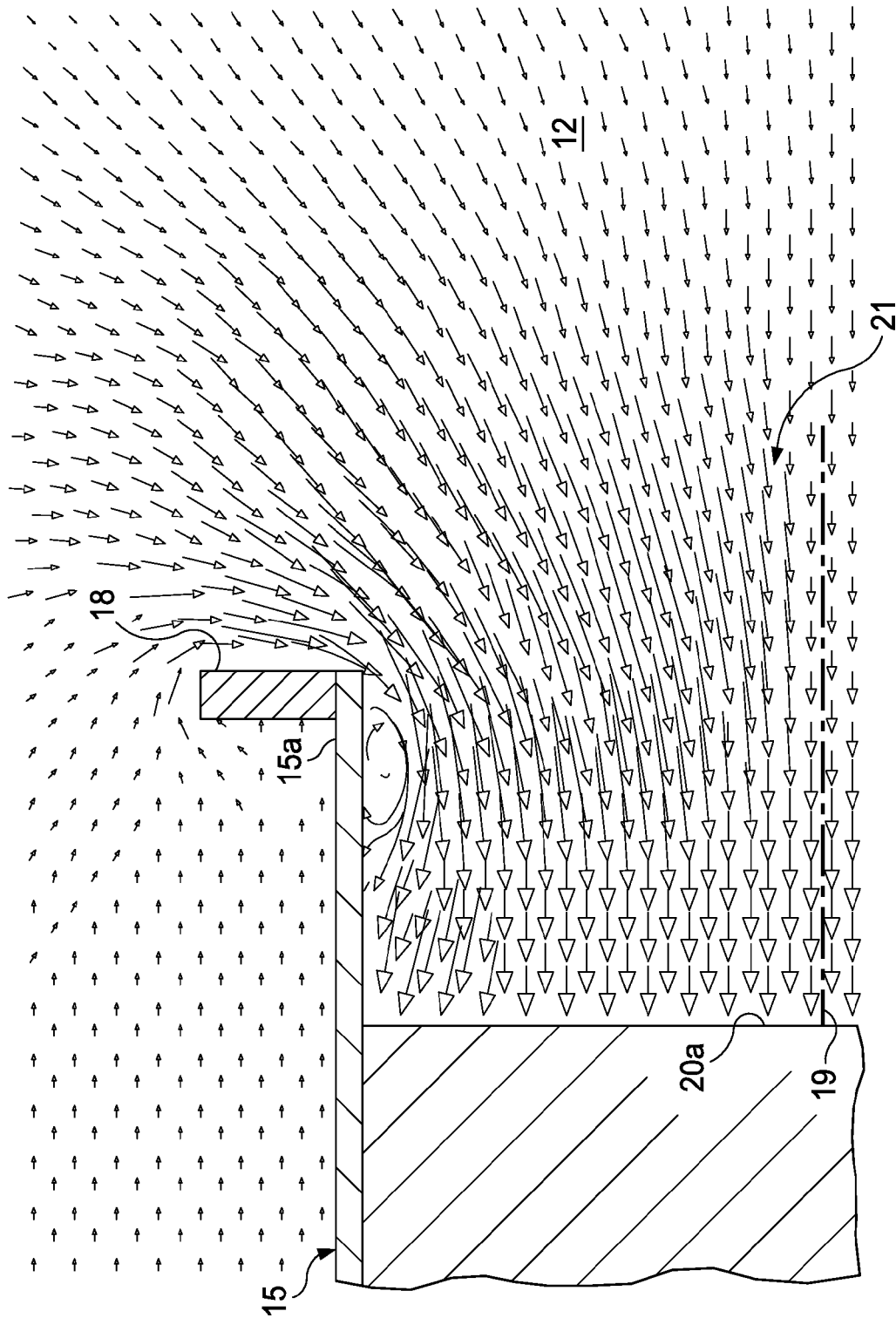
FIG. 7 is a computational-fluid-dynamics (CFD) model of the conventional reciprocating piston marine seismic source of FIG. 1.
Figure 8:
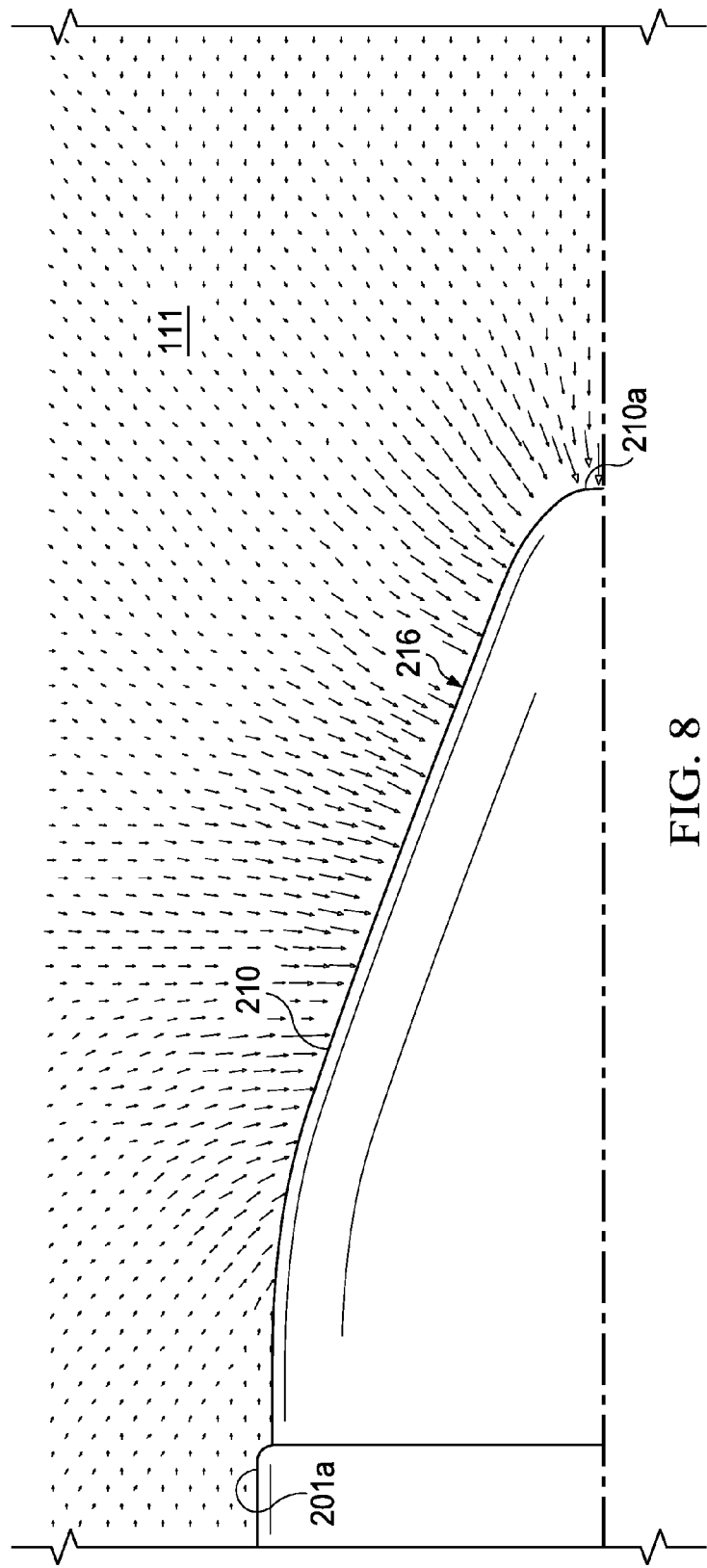
FIG. 8 is a computational-fluid-dynamics (CFD) model of the reciprocating piston marine seismic source of FIGS. 4-6.

Referring now to FIGS. 7 and 8, computational-fluid-dynamics (CFD) modeling has indicated that for low frequencies (e.g., less than 3 Hz) and large amplitudes (e.g., greater than 200 mm of peak-to-peak amplitude) of piston movement, the smoothly contoured bullet-shaped piston 210 and housing 201 with a lipless open end 201a offer the potential to reduce undesirable turbulence in water 111 as compared to some conventional reciprocating piston marine seismic sources (e.g., source 10). For example, in FIG. 7, CFD modeling illustrates velocity vectors in the water 12 proximal open end 15a of the cylinder 15 and planar face 20a of piston 20 of conventional seismic source 10 (FIG. 1); and in FIG. 8, CFD modeling illustrates the velocity vectors in the water 111 proximal open end 201a of housing 201 and end 210a of piston 210 of an embodiment of seismic source 200 (FIGS. 4-6). The CFD modeling results shown in FIGS. 7 and 8 illustrate that seismic source 200 including piston 210 with continuously contoured bullet-shaped outer surface 216 and lipless open end 201a generated less turbulence in the water as compared to conventional seismic source 10 with planar face piston 20 and cylinder 15 including flange 18 extending radially from its open end 15a. Such reductions in turbulence offer the potential to reduce undesirable energy dissipation, thereby enhancing acoustic efficiency. A piston having a non-planar generally bullet-shaped water-facing surface (e.g., outer surface 216 of piston 210 along first section 217) also offers the potential to substantially reduce the force required to drive the piston by reducing the apparent inertia of the fluid as seen by the piston. Without being limited by this or any particular theory, in seismic applications, the force required to overcome fluid inertia is very much larger than drag forces, and a bullet-shaped piston offers the potential reduce the apparent inertia of the fluid by at least 50%. Such a reduction in force leads to a similar reduction in pressure excursions at the piston face, thereby reducing the risk of cavitation.

It should also be appreciated that end cap 202 of housing 201 is also bullet-shaped and has a generally parabolic profile. During operation of source 200, housing 201, and hence end cap 202, reciprocates axially as piston 210 reciprocates within housing 210. In general, the axial movement of housing 201 is less than the axial movement of piston 210, and depends, at least in part, on the relative masses of piston 210 and housing 201. In this embodiment, the amplitude of the reciprocation of housing 201 is about 10% of the amplitude of the reciprocation of piston 210. The bullet-shaped end cap 202 offers the potential for similar benefits as bullet-shaped piston 210 (e.g., reduced turbulence, reduced inertial resistance to movement, etc.).

In FIG. 3, an embodiment of source 200 is shown towed behind a survey ship 101. In general, source 200 may be oriented in any suitable manner. For example, source 200 may be oriented with cylinder central axis 205 substantially horizontal, substantially vertical, or at an acute angle relative to horizontal. Further, in a horizontal orientation, source 200 may be oriented with first end 210a of piston 210 in a leading or trailing position, or perpendicular to the direction of ship motion. For vertical and acute orientations, source 200 is preferably oriented with first end 210a of piston 210 generally facing downward into the water. For reducing flow separation, and hence, unsteady forces at the tip of the nose of the piston, source 200 is preferably towed behind survey ship 101 horizontally with first end 210a of piston 210 in a leading position. This acts to increase the fluid pressure exactly at the point where cavitation is most likely, thus minimizing the opportunity for cavitation. Another preferred geometry is to tow a fin-shaped first end 210a of piston 210 in a trailing position.

In general, the components of reciprocating piston seismic source 200 described herein (e.g., piston 210, housing 201, shaft 220, etc.) may be made from any suitable material(s) including, without limitation, metals and metal alloys (e.g., aluminum, stainless steel, etc.), non-metals (e.g., ceramics, polymers, etc.), composites (e.g., carbon fiber and epoxy composite, etc.), or combinations thereof. Since the piston (e.g., piston 210) and cylinder (e.g., housing 201) are exposed to subsea conditions, each preferably comprises a rigid, durable material capable of withstanding corrosion from saltwater exposure such as inconel or stainless steel coated with nickel or inconel.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:
1. A marine seismic source, comprising:
 a housing having a central axis, an open end, and a closed end opposite the open end;
 a piston extending coaxially through the open end of the housing, wherein the piston is configured to axially reciprocate relative to the housing;

wherein the piston has a first end distal the housing and a second end disposed within the housing;
wherein the piston includes a first section extending axially from the first end and a second section extending axially from the second end to the first section;
wherein the first section has an outer radius R1 and the second section has an outer radius R2;
wherein the outer radius R1 continuously increases moving axially from the first end to the second section;
wherein the outer radius R2 of the second section is constant between the second end and the first section.

2. The marine seismic source of claim 1, wherein the piston has a bullet-shaped outer surface extending from the first end.

3. The marine seismic source of claim 1, wherein the outer surface of the piston is convex between the first end and the second section.

4. The marine seismic source of claim 1, wherein the second section of the piston slidingly engages an inner surface of the housing at the open end.

5. The marine seismic source of claim 1, wherein the outer radius R1 is equal to the outer radius R2 at an intersection of the first section and the second section.

6. The marine seismic source of claim 5, wherein the outer radius R1 is zero at the first end of the piston.

7. The marine seismic source of claim 1, wherein the outer surface of the piston is continuously contoured.

8. The marine seismic source of claim 1, wherein the housing has a tapered outer surface at the open end.

9. The marine seismic source of claim 1, further comprising an air-spring assembly disposed within the housing, wherein the air-spring assembly is coupled to the piston and is axially positioned between the piston and the closed end of the housing.

10. The marine seismic source of claim 9, further comprising a shaft extending axially between the second end of the piston and the air-spring assembly;
wherein the air-spring assembly comprises:
an air-spring cylinder; an air-spring piston coaxially disposed in the air-spring cylinder, wherein the air-spring piston is fixed to the shaft;
an annular squeeze piston positioned about the shaft and coaxially disposed in the air-spring cylinder and axially spaced apart from the air-spring piston, wherein the air-spring piston is axially positioned between the squeeze piston and the piston; and
a linear actuator coupled to squeeze piston, wherein the linear actuator is adapted to move the squeeze piston axially relative to the shaft.

11. The marine seismic source of claim 1, wherein the outer surface of the piston along the first section has a geometry in profile view selected from parabolic, conical, and hemispherical.

12. The marine seismic source of claim 1, wherein the reciprocating piston has an outer surface comprising a fin.

13. A marine seismic source, comprising:
a cylindrical housing having a central axis, a first end, a second end opposite the first end, and a radially outer surface extending from the first end to the second end;
a piston at least partially disposed within the housing, wherein the piston is adapted to axially reciprocate relative to the housing;
wherein the piston has a first end, a second end opposite the first end, and a radially outer surface extending between the first end and the second end;
wherein the outer surface of the piston is disposed at an outer radius R that increases moving axially from the first end;
wherein the outer surface of the housing at the first end of the housing tapers radially inward to the outer surface of the piston.

14. The marine seismic source of claim 13, wherein the piston includes a first section extending axially from the first end of the piston and a second section extending axially from the second end of the piston to the first section of the piston;
wherein the outer radius R increases moving axially from the first end of the piston to the second section of the piston, and wherein the outer radius R is constant in the second section.

15. The marine seismic source of claim 14, wherein the outer surface of the piston is convex between the first end and the second section.

16. The marine seismic source of claim 14, wherein the second section of the piston slidingly engages an inner surface of the housing.

17. The marine seismic source of claim 13, wherein the outer radius R1 is zero at the first end of the piston.

18. The marine seismic source of claim 13, wherein the outer surface of the piston is continuously contoured.

19. The marine seismic source of claim 13, further comprising an air-spring assembly disposed within the housing, wherein the air-spring assembly is coupled to the piston and is axially positioned between the piston and the second end of the housing.

20. A system for performing offshore seismic exploration operations, comprising:
a seismic vessel disposed at the sea surface;
an oscillating piston seismic source coupled to the seismic vessel and disposed below the sea surface;
wherein the seismic source comprises: a cylindrical housing having a central axis and an open end;
a piston coaxially disposed in the housing and extending axially through the open end of the housing;
wherein the piston has a first end outside the housing and a second end disposed within the housing; and
wherein the piston has an outer surface disposed at a radius R;
wherein the piston includes a first section extending axially from the first end and a second section extending axially from the second end to the first section;
wherein the radius R continuously increases moving axially along the first section from the first end to the second section;
wherein the radius R is constant moving axially along the second section from the second end to the first section; and
wherein the outer surface of the piston is continuously contoured.

21. The system of claim 20, wherein the piston has a parabolic outer profile extending from the first end toward the second end.

22. The system of claim 20, wherein the outer surface of the piston is convex between the first end and the second section.

23. The system of claim 20, wherein the second section of the piston slidingly engages an inner surface of the housing.

24. The system of claim 20, further comprising a streamer coupled to the seismic vessel, wherein the streamer includes a plurality of seismic receivers.

25. The system of claim 20, further comprising a plurality of seismic receivers disposed along the sea floor.

* * * * *